United States Patent [19]

Moore et al.

[11] Patent Number: 4,597,259

[45] Date of Patent: Jul. 1, 1986

[54] PRESSURE RESPONSIVE ENGINE CONTROL SYSTEM

[75] Inventors: M. Samuel Moore; Charles F. Paluka, both of Northridge, Calif.

[73] Assignee: Semco Instruments, Inc., No. Hollywood, Calif.

[21] Appl. No.: 608,400

[22] Filed: May 9, 1984

[51] Int. Cl.$^4$ .............................................. F02C 7/262
[52] U.S. Cl. ................................. 60/39.091; 60/39.091
[58] Field of Search ........... 60/39.091, 39.821, 39.141, 60/39.142, 204

[56] References Cited

U.S. PATENT DOCUMENTS

| | | | |
|---|---|---|---|
| 3,041,833 | 7/1962 | Vore | 60/39.091 |
| 3,232,051 | 2/1966 | Mansfield, Jr. et al. | 60/39.091 |
| 3,504,490 | 4/1970 | Klamm | 60/39.821 |
| 3,611,282 | 10/1971 | Hill | 60/39.091 X |
| 3,805,517 | 4/1974 | Sewell et al. | 60/39.091 X |
| 3,830,055 | 8/1974 | Erlund | 60/39.091 |

OTHER PUBLICATIONS

Metzger, *Electronic Circuit Behavior*, Prentice-Hall, Inc., New Jersey, 1975, pp. 295-296.
*The Jet Engine*, Rolls-Royce Ltd., 1969, pp. 123-133.

*Primary Examiner*—Louis J. Casaregola
*Attorney, Agent, or Firm*—Poms, Smith, Lande & Rose

[57] ABSTRACT

A control system for a jet or turbine aircraft includes a electrical pressure sensor of the type which does not include interconnected mechanical linkages, such as capacitive transducers, and which are therefore stable over a wide range of temperature and other adverse conditions. The pressure sensor is coupled to detect the pressure resulting from the operation of the aircraft engine. The system detects departures from normal operating conditions, such as a flameout of the aircraft engine, and restores the aircraft engine to normal operating conditions by reignition, by operating the starter motor, or other similar steps. Controllable hysteresis may be introduced into the system to determine both the pressure at which the control action is initiated and a different pressure where it is stopped. The system may operate in conjunction with pressure metering and other aircraft systems without hysteresis.

2 Claims, 3 Drawing Figures

PRESSURE RESPONSIVE ENGINE CONTROL SYSTEM

FIELD OF THE INVENTION

This invention relates to aircraft engine control systems.

BACKGROUND OF THE INVENTION

In systems for the control of fixed wing aircraft or helicopter engines, it has previously been proposed to use pressure responsive systems including pressure sensors of the electromechanical types. However, these prior systems have been relatively expensive, and in some cases have been subject to failure or to a lack of reliability. Further, this type of pressure transducer tends to have more uncontrolled component hysteresis than might be desirable, and is subject to variations with extremes of temperature often found in aircraft environments, and the output may be adversely affected by humidity or other ambient conditions. Particularly where the transducer is intended to measure adverse operating conditions in or near a jet or turbine engine, it is important that the pressure transducer which is employed be highly stable under adverse conditions. In addition, where switching circuits are used, it is important to insure positive operation of the circuitry.

Accordingly, an important object of the present invention is to improve the reliability of aircraft engine control systems involving the sensing of pressure.

SUMMARY OF THE INVENTION

In accordance with the present invention, a control system for a jet or turbine aircraft engine includes an electrical or electronic pressure transducer for sensing the pressure resulting from the operation of the aircraft engine; and the electrical pressure transducer, which may be of the capacitive, piezo-resistive or strain gauge types, includes no interconnected mechanical linkages. This system also includes arrangements for changing the operating parameters of the aircraft engine, and circuitry responsive to indications from the pressure transducer, to change the operating conditions of the aircraft engine, particularly when the engine is outside of desired or normal safe operating parameters.

In accordance with one aspect of the invention, the output of the electrical or electronic pressure transducer may be applied to an operational or other similar amplifier, with controllable feedback from the output of the amplifier to at least one of the two inputs thereof, whereby the pressure for tripping from one output state of the amplifier to another may be selectively controlled depending on whether the pressure is increasing or decreasing as the critical pressure level is approached.

In one embodiment of the invention the pressure transducer detects "flameout" of a jet or turbine engine, and automatically energizes a reigniter to start combustion again. This may be accomplished at one pressure level, as the pressure is dropping, with the reigniter being readied; and the aircraft engine starter motor may be operated similarly at lower pressure levels.

In accordance with a feature of the invention, the preferred type of electrical or electronic pressure transducer is a capacitive pressure transducer using opposed conductive plates with at least one of the plates being mounted on a thin flexible insulating diaphragm, to move toward and away from the other plate with changes in temperature. Electronic circuitry for converting pressure changes into linear corresponding voltage changes may also form part of the electrical or electronic transducer.

Other objects, features and advantages of the invention will become apparent from a consideration of the following detailed description and from the accompanying drawings.

DETAILED DESCRIPTION

Figure 1:
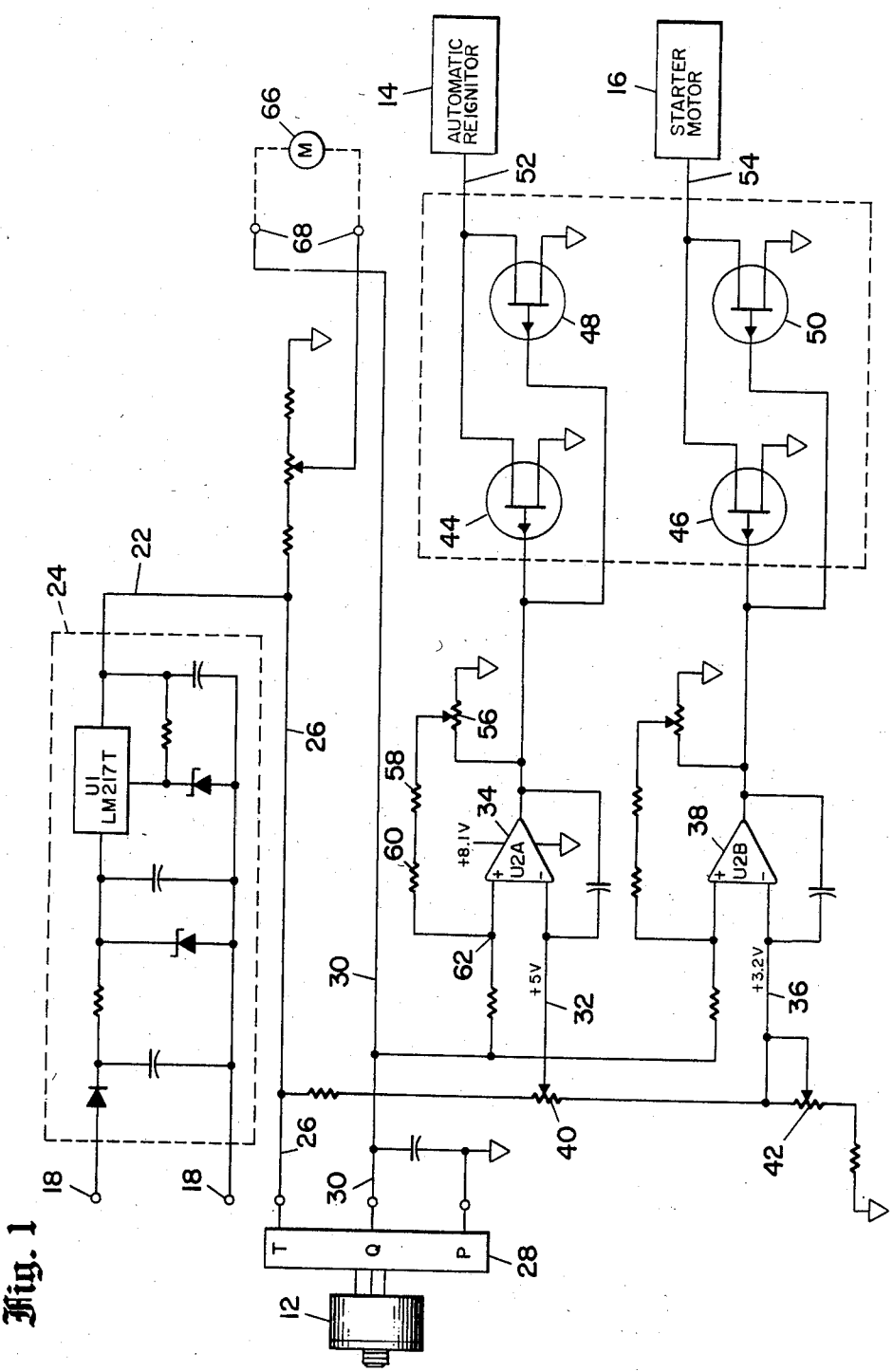
FIG. 1 is a circuit diagram of a system including switching circuitry for controlling the operation of selected equipment when the aircraft engine pressure being sensed drops below certain predetermined levels.

Referring more particularly to the drawings, FIG. 1 is a circuit diagram of a preferred embodiment of the invention involving the control of an aircraft engine with an electrical or electronic pressure transducer unit as discussed hereinabove. More specifically, from an overall standpoint, the pressure transducer 12 is connected directly to a jet engine, such as that shown in FIG. 3 of the drawings and, in the event of flameout, for example, it controls the operation of an automatic reignition circuit 14 which appears at the far right in FIG. 1; and in the event of further dropping of the pressure, the aircraft starter motor 16 is operated to insure that appropriate operating conditions for reignition are present in the engine.

Now, considering the circuit of FIG. 1, whereby the above functions are accomplished, in greater detail, the 28 volt direct current aircraft power is provided at terminals 18 at the upper left in FIG. 1. The voltage supplied to the output lead 22 from the power supply circuit 24 may, for example, be 8.1 volts. This regulated power is supplied on lead 26 through connector 28 to the electronics included in the pressure transducer unit 12. The signal on lead 30 representing the sensed pressure, ranges from 0.69 volts to 6.2 volts. Appropriate reference potentials which may, for example, be 5 volts on input lead 32 to operational amplifier 34, and 3.2 volts on input lead 36 to operational amplifier 38, are provided by the resistance ladder including the potentiometers 40 and 42. When the pressure inputs to the operational amplifiers 34 and 38 exceed the reference potentials applied to these operational amplifiers, their outputs go "high", turning on one or both of the field effect transistors 44 and 46, as well as the parallel paired field effect transistors 48 and 50. When these power field effect transistors are turned on, it has the effect of providing a low resistance ground path at the input lead 52 to the automatic reignition circuit 14, or to the input lead 54 to the starter motor 16.

In a typical example, the upper circuit operating the automatic reigniter 14 could be operative at pressures below about 70 psi; while the lower circuit controlling the starter motor 16 might be operative at pressures below about 40 psi. It is to be understood that these values will differ depending on the particular engine which is under consideration and the manufacturer's operating parameters. Incidentally, when the input pressure signal is above the preset levels at the inputs to operational amplifiers 34 and 38, these circuits are turned on, energizing the FET's 44 and 48, for example, and the reignition circuit 14 is turned off. At lower pressures, when the input FET's are cut off, the reignition circuit 14 turns on.

One advantageous feature which is included in the circuit of FIG. 1 is the "hysteresis" built into the circuits associated with operational amplifiers 34 and 38. This hysteresis provides positive switching action without oscillation, and is accomplished by the feedback path including potentiometer 56 and resistors 58 and 60 associated with operational amplifier 34 and a similar feedback path associated with operational amplifier 38. More specifically, when the turbine engine pressure is above 68 psi, for example, the output from the operational amplifier will be "high" or about 6 volts, and the resistive feedback circuit will raise the trip point of the circuit slightly. Thus, suppose that, with an initial higher pressure and the pressure dropping to 70 psi, the voltage output from pressure transducer 12 onto line 30 is 5 volts, and the Op Amp 34 would be turned on. With these conditions, the voltage at the summing point 62 would be shifted down somewhat, perhaps to 5.2 volts, and a further drop in pressure perhaps to 69 psi or 68 psi would be needed to bring the voltage at the positive input of circuit 34 down to the 5 volts needed, for turn-off of this operational amplifier 34.

The output voltage of the operational amplifier 34 would then drop to about 0.5 volts, and the potential at summing point 62 would be slightly less than that applied on lead 30 from the transducer. Under these conditions, the pressure would have to rise a bit about 70 psi, perhaps to 71 psi, in order to turn on the operational amplifier 34 and turn off the automatic reigniter 14.

This hysteresis insures positive control circuit operation, and adequate energization of the automatic reigniter circuit 14 and/or the starter motor 16, so that reignition is assured.

Concerning the types of components which may be employed in the circuit of FIG. 4, the operational amplifiers 34 and 38 may be any of a number of well known types which are commercially available, including LM-158 or MC-747. The power field effect transistors 44, 46, 48 and 50 may be of the type known as VMOS Power Field Effect Transistors. The pressure transducer 12 may be a capacitive transducer available from the Power Management Systems Division of Semco Instruments Company, located at 21541 Blythe Street, Canoga Park, Calif. 91304. The capacitive transducer is also available under Model P612 from Kavlico Corporation 20869 Plummer Street, Chatsworth, Calif. 91311. The transducer is formed of two ceramic disks, which are spaced apart by a small gap, and which are provided with flat electrodes facing one another. One of the ceramic disks is very thin and acts as a diaphragm which flexes and changes the spacing of the electrodes as pressure is applied to the input port which appears to the far left in FIG. 1 of the present drawings on the left-hand side of component 12. This capacitive pressure transducer is highly stable with changes in temperature, and can withstand high overpressures without zero shift.

A meter 66 may be connected to terminals 68 to display the operating pressure sensed by pressure tranducer 12. The pressure signal may also be applied to other aircraft systems, and either directly amplified pressure signals, or switching circuitry including hysteresis may be used depending on the requirements of each case.

Figure 2:
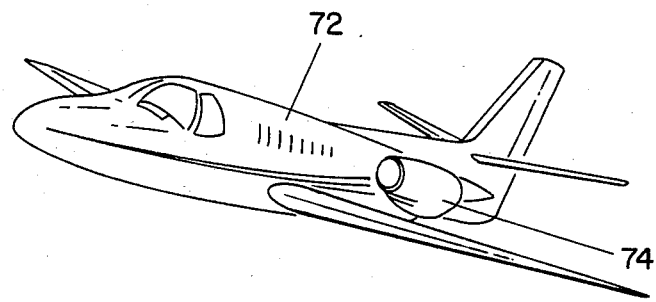
FIG. 2 shows an aircraft provided with two engines of the type shown in FIG. 3.
Figure 3:
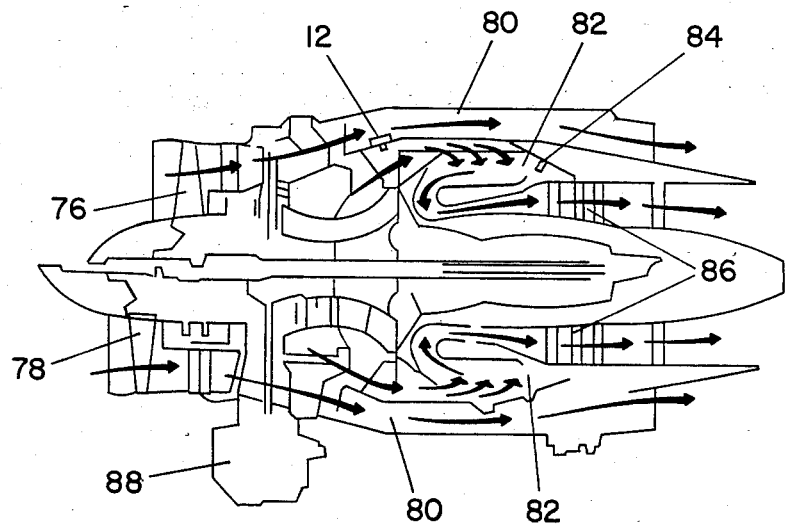
FIG. 3 shows a turbofan engine including a pressure transducer, to which the system of FIG. 1 is applicable.

FIGS. 2 and 3 disclose a typical aircraft and aircraft engine to which the invention of FIG. 1 would be applicable. More specifically, FIG. 2 shows a Cessna Citation aircraft 72 equipped with two turbofan engines 74, designated JT-15D made by Pratt & Whitney Aircraft Company of Canada. In FIG. 3, which shows the construction of the engine 74, slightly different engine configurations are shown in the upper and lower sections, with increased power being provided by the longer engine shown in the lower section of FIG. 3. In a turbofan engine of the type shown in FIG. 3, most of the thrust of the engine is provided by the fan, with the blades 76 and/or 78 being shown at the lefthand end, or the front of the engine. A peripheral air passageway 80 receives the bulk of the thrust from the fan blades 76 and/or 78, and this supplies the main propulsion for the aircraft. An inner air passageway is of re-entrant configuration with combustion taking place in the zone indicated by reference numeral 82 in FIG. 3. As the gases burn and expand, they follow the path indicated by the arrows, and drive the turbine blades 86. These turbine blades 86 are secured to a central drive shaft, and appropriate gearing which is not shown in detail in FIG. 3, which drives the fan blades 76 and/or 78. The fuel controller unit, which may for example be made by Bendix is shown at reference numeral 88 in FIG. 3.

For early detection of flameout, the pressure transducer 12 may be mounted as indicated in FIG. 3, just before the air is directed inwardly and combustion is initiated. The ignition element 84 is located in the region 82 where the fuel and air are combined.

In conclusion, it is to be understood that the foregoing detailed description and the drawings relate to illustrative embodiments of the invention. Other arrangements within the scope of the invention could include alternative pressure transducers, and different electronic or logic circuitry which would accomplish the disclosed functions; and the pressure transducer may be employed for the control of other aircraft functions in accordance with the principles of this invention. Accordingly, the present invention is not limited to that precisely as shown in the drawings and described in detail hereinabove.

What is claimed is:

1. A switching control system for a jet or turbine aircraft engine comprising:

electrical pressure transducer means for sensing the pressure resulting from the operation of the aircraft engine and for providing an electrical output signal representative of said pressure;

an aircraft engine reigniter;

switching electronic circuit means for selectively turning said reigniter on and off;

said switching circuit means including a first input for establishing a switching level for said circuit means, and a second control input means connected to receive said electrical output signals representing pressure;

means for applying an adjustable control signal to said first input;

feedback circuit means associated with said switching circuit for adjusting the hysteresis of said switching circuit to provide first and second different trip points for said switching circuit as the pressure increases or decreases, respectively, toward said trip point;

said system including at least a second aircraft control unit and at least a second switching electronic circuit means connected as defined hereinabove to actuate said second control unit, and including means to actuate said second switching means and said second control unit at different pressures than said first switching means, said second control unit being a jet or turbine engine starter motor; and said pressure transducer including a variable capacitive unit with a flexible diaphragm.

2. A switiching control system for a jet or turbine aircraft engine comprising:

electrical pressure transducer means for sensing the pressure resulting from the operation of the aircraft engine and for providing an electrical output signal representative of said pressure;

an aircraft engine reigniter;

switching electronic circuit means for selectively turning said reigniter on and off;

said switching circuit means including a first input for establishing a switching level for said circuit means, and a second control input means connected to receive said electrical output signals representing pressure;

means for applying an adjustable control signal to said first input;

feedback circuit means associated with said switching circuit for adjusting the hysteresis of said switching circuit to provide first and second different trip points for said switching circuit as the pressure increases or decreases, respectively, toward said trip point; and said pressure transducer including a variable capacitive unit with a flexible diaphragm.

* * * * *